US006892187B2

(12) United States Patent
Phillips et al.

(10) Patent No.: US 6,892,187 B2
(45) Date of Patent: May 10, 2005

(54) DEBIT PURCHASING OF STORED VALUE CARD FOR USE BY AND/OR DELIVERY TO OTHERS

(75) Inventors: Gregory Joseph Phillips, Landenberg, PA (US); Rebecca Deporte, Landenberg, PA (US); Jeffery A. Norwine, Wilmington, DE (US); Penny B. Joines, Media, PA (US)

(73) Assignee: Bank One, Delaware, National Association, Wilmington, DE (US)

( * ) Notice: Subject to any disclaimer, the term of this patent is extended or adjusted under 35 U.S.C. 154(b) by 34 days.

(21) Appl. No.: 10/441,067

(22) Filed: May 20, 2003

(65) Prior Publication Data

US 2003/0195849 A1 Oct. 16, 2003

Related U.S. Application Data

(63) Continuation of application No. 09/102,044, filed on Jun. 22, 1998, now Pat. No. 6,615,189.

(51) Int. Cl.[7] .............................................. G06F 17/60
(52) U.S. Cl. .............................. 705/41; 705/14; 705/26
(58) Field of Search ................................ 705/1, 14, 26, 705/41; 455/406; 379/114

(56) References Cited

U.S. PATENT DOCUMENTS

| | | |
|---|---|---|
| 3,946,206 A | 3/1976 | Darjany |
| 4,047,033 A | 9/1977 | Malmberg |
| 4,582,985 A | 4/1986 | Lofberg |
| 4,750,119 A | 6/1988 | Cohen |
| 4,831,242 A | 5/1989 | Englehardt |
| 4,897,533 A | 1/1990 | Lyszczarz |
| 4,978,401 A | 12/1990 | Bonomi |
| 5,095,194 A | 3/1992 | Barbanell |
| 5,117,355 A | 5/1992 | McCarthy |
| 5,175,416 A | 12/1992 | Mansvelt et al. |
| 5,180,901 A | 1/1993 | Hiramatsu |
| 5,192,947 A | 3/1993 | Neustein |
| 5,202,826 A | 4/1993 | McCarthy |
| 5,218,631 A | 6/1993 | Katz |
| 5,326,960 A | 7/1994 | Tannenbaum |
| 5,349,633 A | 9/1994 | Katz |
| 5,350,906 A | 9/1994 | Brody et al. |
| 5,365,575 A | 11/1994 | Katz |
| 5,397,881 A | 3/1995 | Mannik |

(Continued)

FOREIGN PATENT DOCUMENTS

WO   WO 9858345   12/1998

OTHER PUBLICATIONS

CardEx's IncentiveCards, as disclosed in the CardEx web site archived by web.archive.org on Feb. 7, 1998 [http://web.archive.org/web/*/http://www.cardex.com], retrieved Oct. 18, 2003.*

CardEx web site archived by web.archive.org on Oct. 31, 1996 [http://web.archive.org/web/*/http://www.cardex.com], retrieved Oct. 18, 2003.*

Anonymous. "A New Weapon for Fighting Debit Fraud." Bank Network News, vol. 15, No. 6, pp. 1, 5, Aug. 12, 1996.*

(Continued)

Primary Examiner—Susanna M. Diaz
(74) Attorney, Agent, or Firm—Hunton & Williams LLP

(57) ABSTRACT

A method of issuing a purchase card is provided. The method includes the steps of presenting a purchaser with the opportunity to buy the purchase card, determining whether the purchaser has sufficient funds to pay for the purchase card, creating a purchase card account for a recipient designated by the purchaser, and issuing the purchase card. The purchase card may also be issued in connection with another credit card, for example as a rebate for purchases on the credit card. The purchase card may also be converted to a credit card.

18 Claims, 2 Drawing Sheets

U.S. PATENT DOCUMENTS

| | | | |
|---|---|---|---|
| 5,424,524 A | | 6/1995 | Ruppert |
| 5,450,477 A | | 9/1995 | Amarant |
| 5,459,306 A | | 10/1995 | Stein |
| 5,465,206 A | | 11/1995 | Hilt |
| 5,466,919 A | | 11/1995 | Hovakimian |
| 5,471,669 A | | 11/1995 | Lidman |
| 5,477,038 A | | 12/1995 | Levine |
| 5,482,139 A | | 1/1996 | Rivalto |
| 5,483,444 A | | 1/1996 | Heintzeman |
| 5,500,514 A | | 3/1996 | Veeneman |
| 5,530,232 A | | 6/1996 | Taylor |
| 5,553,120 A | | 9/1996 | Katz |
| 5,578,808 A | | 11/1996 | Taylor |
| 5,585,787 A | | 12/1996 | Wallerstein |
| 5,637,845 A | | 6/1997 | Kolls |
| 5,689,650 A | | 11/1997 | McClelland |
| 5,703,344 A | | 12/1997 | Bezy et al. |
| 5,710,886 A | | 1/1998 | Christensen |
| 5,721,768 A | | 2/1998 | Stimson |
| 5,729,693 A | | 3/1998 | Holda-Fleck |
| 5,765,141 A | | 6/1998 | Spector |
| 5,774,870 A | | 6/1998 | Storey |
| 5,777,305 A | | 7/1998 | Smith |
| 5,787,156 A | | 7/1998 | Katz |
| 5,787,404 A | | 7/1998 | Fernandez-Holmann |
| 5,806,042 A | | 9/1998 | Kelly |
| 5,835,576 A | | 11/1998 | Katz |
| 5,857,079 A | | 1/1999 | Claus |
| 5,857,709 A | | 1/1999 | Chock |
| 5,864,830 A | | 1/1999 | Armetta |
| 5,870,718 A | | 2/1999 | Spector |
| 5,926,800 A | | 7/1999 | Baronowski |
| 5,955,961 A | | 9/1999 | Wallerstein |
| 5,970,480 A | | 10/1999 | Kalina |
| 5,974,399 A | | 10/1999 | Giuliani |
| 5,991,750 A | | 11/1999 | Watson |
| 6,000,608 A | * | 12/1999 | Dorf .......................... 235/380 |
| 6,000,832 A | | 12/1999 | Franklin |
| 6,009,415 A | | 12/1999 | Shurling |
| 6,016,954 A | | 1/2000 | Abe et al. |
| 6,032,136 A | | 2/2000 | Brake, Jr. |
| 6,036,099 A | | 3/2000 | Leighton |
| 6,038,552 A | | 3/2000 | Fleischl |
| 6,070,153 A | | 5/2000 | Simpson |
| 6,105,865 A | | 8/2000 | Hardesty |
| 6,128,598 A | | 10/2000 | Walker |
| 6,128,599 A | | 10/2000 | Walker |
| 6,164,533 A | | 12/2000 | Barton |
| 6,189,787 B1 | | 2/2001 | Dorf |
| 6,227,447 B1 | | 5/2001 | Campisano |
| 6,243,688 B1 | | 6/2001 | Kalina |
| 6,341,724 B2 | | 1/2002 | Campisano |
| 6,345,261 B1 | | 2/2002 | Feidelson |
| 6,615,189 B1 | | 9/2003 | Phillips et al. |

OTHER PUBLICATIONS

"Prepared Statement of Russell W. Schrader Visa U.S.A. Inc. Before the House Banking and Financial Services Committee Financial Institutions and Consumer Credit Subcommittee." Sep. 24, 1997.*

CardEx Incentives, Apr. 6, 1999, www.cardexco.com 15 pages.

"Associates First Capital Corporation", Hoover's Inc., The Industry Standard: The Newsmagazine of the Internet Economy, thestandard.net/companies/cpmpany–display, Apr. 6, 1999, 2 pages.

Jeffrey M. Lacker, "Stored Value Cards: Costly Private Substitutions for Government Currency", Economic Quarterly, 1996, vol. 82, No. 3, 17 pages.

"The Evolution of a New Consumerism", Chain Store Age, vol. 73, 4 pages, Jun. 1997.

Lisa Fickenscher, "Amex prepaid offering is latest card for firms regarding employees", American Banker, vol. 161, No. 151, p. 11, Aug. 8, 1996.

"Welcome to Swiftgift", Swiftgift, www.swiftgiftcard.com, Dec. 8, 1998, 10 pages.

Lucy Lzarony, "Stuck for a gift? Give a prepaid credit card", www.bankrate.com, Dec. 21, 1998, 2 pages.

Antoinette Coulton, "Incentives field moving to card–based series 14", American Banker, Mar. 26, 1998 pp. 1–3.

Credit Card News, "A store card issuer looks for lift from electronic gift certificates", Feb. 1, 1995 pp. 4.

Stefani C. O'Conner, Business Travel News, "Maritz gets mastercard's stamp of approval", Aug. 19, 1996, 2 pages.

Debit Card News, vol. 2, Issue 2, "Boatman's floats stored value into the employee incentive waters", Jul. 16, 1996, 3 pages.

Mickey Meece, "Boatman's prepaid cards for worker–incentive firm", American Banker, Jul. 2, 1996, 1 page.

Card News, vol. 6, No. 25, "D.C. Area Safeway stores look for increase in sales volume and revenue with cards", Dec. 1991, pp. 1–3.

Ralph E. Spurgin, "Sopininmon! Or What's happening in the retail credit card environment", Credit World Journal, Mar. 1997, Credit World, vol. 85, No. 4.

AT&T Marketing, "Universal card free lifetime membership extended 3 months", www.att.com/press/0297/970217.csa.html, Dec. 4, 1990, 2 pages.

Chain Store Age Executive with Shopping Center Age, "More retailers turn to co–branding", Feb. 1, 1995, vol. 71, No. 2, ISSN: 0193–1199, pp. 1–3.

Introducing SpendingMoney™, Armetta: Marketing & Design Product Concept Report, Oct. 9, 1996, 15 pages.

First USA Platinum Connect, First USA Bank, First USA Promotional Mailing, Oct. 1997, pp. 2–6.

Introducing the First USA Platinum Connect Card, First USA Promotional Mailing, Dec. 1997, pp. 1–5.

Here's the calling cnvenience you asked for: 1–800–call–AT&T . . . For All Calls, Appendix A: For Card Carriers, 7 pages.

Beth Piskora, Debit Cards Seen Poised for New Markets, American Banker, pp. 16, Mar. 7, 1995, 1 page.

Nick Rosen, Cash Just Isn't Flexible Enough: Shops of the Future Will Only Take Cards, Daily Express: Technology Section, Feb. 10, 1995, 1 page.

Phil Britt, Competing in Auto Lending, America's Community Banker, vol. 5, No. 11, pp. 33–37, Nov. 1, 1996, 7 pages.

Miriam Krenin Souccar, Smart Cards: 1$^{st}$ Union Smart Card Pilot Enlists a Second Army Base, American Banker, 3 pages.

First Union Issues Smart Cards to Fort Benning Recruits, CardFax, 1 page.

Emerson Brown and Jim Baum, Purchasing Card Magic: Eli Lilly Finds Accounts Payable Flying High With Plastic, Corporate Cashflow, 4 pages, Corporate Cashflow, vol. 15, No. 12, 1994.

AT&T News Release, Monday Feb. 17, 1997, New 1–800–CALL–ATT campaign promotes one number for all calls, 2 pages.

Christine Dugas, Payroll May Ask: Paper or Plastic?, USA Today, 3B, Aug. 14, 2001, 1 pages.

Swift Gift 'Wows' Internet Shoppers, PR Newswire, Wednesday, Dec. 2, 1998, 2 pages.

Incentive Firms Find Debit Cards A Rewarding Experience, No. 11, vol. 3, Nov. 28, 1997, Newsletter ISSN: 1055–176X, 3 pages.

British Patent Office Search Report.

Cards International Jan. 30, 1996, First Data markets stored–value cards, 2 pages.

Business Wire, Jan. 15, 1996, CES/NaBANCO introduces stored value card technology; blockbuster video is first merchant partner, 2 pages.

Melinda Norris, et al., Omaha World Herald, Jan. 19, 1996, Sunrise Edition, First data unit develops blockbuster cash card, 2 pages.

Valerie Block, The American Banker, Sep. 1, 1995, Blockbuster running test of a stored value card, 2 pages.

* cited by examiner

US 6,892,187 B2

DEBIT PURCHASING OF STORED VALUE CARD FOR USE BY AND/OR DELIVERY TO OTHERS

CROSS REFERENCE OF RELATED APPLICATION

This application is a continuation of U.S. application Ser. No. 09/102,044 filed Jun. 22, 1998, now U.S. Pat. No. 6,615,189.

FIELD OF THE INVENTION

This invention relates to a system for purchasing or transferring of stored value or debit purchasing cards, which can be pre-arranged to be given as a gift to a designated recipient.

BACKGROUND OF THE INVENTION

On many occasions, consumers, other bank customers, credit card holders, and other persons find it is desirable to arrange for another person, perhaps a relative, to have access to a specified sum of money. For example, a parent might want to arrange for a child to have access to money when the child is taking a trip or going away to college. One may also find it desirable to mail a gift to another person who is geographically distant. In these and other cases, it is often undesirable to give away or send cash. If lost or stolen, cash is practically unrecoverable. Traveler's checks are also undesirable as they must be purchased at a bank and are not acceptable for many types of purchases. Gift certificates are also undesirable because they require the recipient to purchase from the merchant that issued the gift certificate. These and other drawbacks exist to the aforementioned alternatives.

SUMMARY OF THE INVENTION

An object of the invention is to overcome these and other drawbacks in existing purchase schemes.

Another object of the invention is to provide a method for issuing a purchase card comprising: presenting a purchaser with the opportunity to buy the purchase card, determining whether the purchaser has sufficient funds to pay for the purchase card, creating a purchase card account for a recipient designated by the purchaser; and issuing the purchase card.

A further object of the invention is to provide a purchase card where the recipient activates the purchase card.

A further object of the invention is to provide a purchase card where the purchase card account contains a monetary amount determined by the purchaser of the purchase card.

A further object of the invention is to provide a purchase card where money can be added to the balance of an issued purchase card account.

A further object of the invention is to provide a purchase card where the purchase card is activated when the issuer of the purchase card is notified that the recipient has received the purchase card.

A further object of the invention is to provide a purchase card where the issuer of the purchase card notifies the purchaser that the recipient has received the purchase card.

A further object of the invention is to provide a purchase card where the purchaser may designate with which merchants the purchase card may be used.

A further object of the invention is to provide a purchase card where the purchase card is activated for a predetermined period of time.

Another object is to provide a method for issuing a purchase card as a rebate award comprising: issuing a credit card to a cardholder, said credit card being associated with a sponsor calculating a rebate amount based upon cardholder purchases made with said credit card, issuing a purchase card to a cardholder or to a recipient designated by said cardholder, said purchase card having a purchase value determined by said rebate amount.

A further object of the invention is to provide a purchase card where the recipient of the purchase card activates the card.

A further object of the invention is to provide a purchase card where the recipient activates the purchase card by notifying the issuer that the recipient has received the purchase card.

A further object of the invention is to provide a purchase card where the purchase card is activated for a predetermined period of time.

A further object of the invention is to provide a purchase card where the rebate is calculated based on all purchases made with the credit card.

A further object of the invention is to provide a purchase card where the rebate is calculated based on purchase from the sponsor made with the credit card.

A further object of the invention is to provide a purchase card where the sponsor notifies the issuer of the amount of rebate due a credit card holder, and the issuer creates a purchase card in that amount.

A further object of the invention is to provide a purchase card where the rebate is based on the monetary value of the purchases.

Another object of the present invention is to provide a method for converting a purchase card into a credit card comprising: creating a purchase card account for a recipient designated by the purchaser; issuing the purchase card; receiving a request from the recipient to convert the purchase card into a credit card; determining whether the recipient meets predetermined credit criteria to convert the purchase card into a credit card; creating a credit card account; and converting the purchase card into a credit card.

A further object of the invention is to provide a purchase card where the balance of the purchase card account is transferred to the credit card account.

A further object of the invention is to provide a purchase card where the credit cards is immediately activated upon being converted from a purchase card.

Other objects and advantages exist for the present invention.

DETAILED DESCRIPTION OF THE PREFERRED EMBODIMENTS

Figure 1:
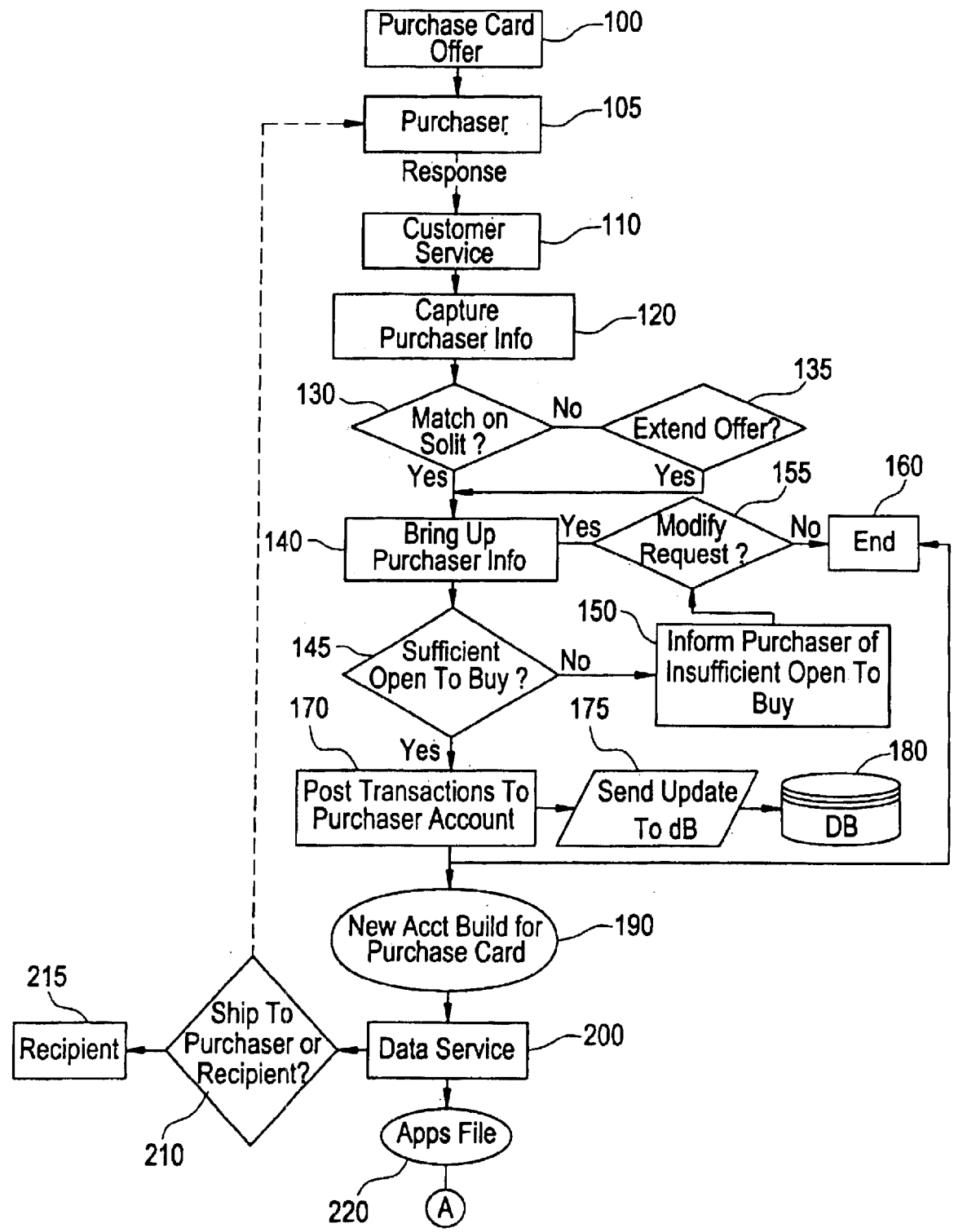
FIG. 1 shows a flow diagram for a portion of the purchase card system.

One embodiment of the purchase card system is shown in FIG. 1. In this embodiment the purchase card process begins with an offer to purchase a gift card at step 100. The offer may be in any suitable form that would notify prospective purchasers 105 of the availability of the purchase card. For example, a written solicitation may be mailed or otherwise distributed to potential purchasers 105. The offer may also be in the form of oral notification, for example, a telephone call to prospective purchasers 105. Alternatively, the offer may be published over a computer network, for example, on an Internet Web site. Other forms of offering the sale of a purchase card are also possible. In one embodiment of the invention, offers are made to prospective purchasers who already have a financial relationship with the offeror. Other potential purchasers may also be offered the opportunity to obtain a purchase card.

The offer may be accepted by a purchaser 105 by notifying a customer service center 110. The acceptance may be in any form acceptable to the customer service center 110. For example, the purchaser may mail, fax, or otherwise transmit a written acceptance, telephone an acceptance, or electronically transmit, for example, via Web Site, an acceptance by computer or other suitable device. At step 120, the customer service center 110 receives pertinent information to identify the purchaser 105 and the purchaser's desired spending limit for the purchase card. For example, the customer service center may identify the purchaser 105 by name, address, credit card account number, social security number, other unique identifiers or a combination of identifiers.

At step 130, the customer service center 120 is checked to verify that the caller or purchaser was included in the solicitations for this program. If the caller or purchaser was not originally solicited, customer service 120 determines whether to extend an offer in step 135.

If the caller or purchaser was solicited 130, certain purchaser 105 information may be accessed at 140. If, for example, the purchaser wishes to pay for the purchase card with a credit card, the purchaser's credit card account information may be accessed. For example, the purchaser's available credit limit may be accessed at 145 to verify that sufficient credit is available to cover the spending amount of the purchase card. If the available credit is insufficient, the purchaser 105 may be so informed at 150. The purchaser 105 may be given the opportunity to modify the purchase card spending amount, at 155, in order to ensure that the purchase amount does not exceed the available credit.

The process may terminate at 160 if, for example, the purchaser 105 does not wish to modify the purchase amount.

After it has been determined that the purchaser's available credit is sufficient, a transaction may be posted to the purchaser's credit card for the amount of the purchase at 170. In another embodiment of the present invention, a purchaser may use a check, cash, or other financial methods to obtain a purchase card. Regardless of the purchasing method, the issuer of the purchase card must determine whether the purchaser has sufficient funds to purchase the card.

When the purchase card is paid for by credit or bank account, the purchaser's account balance is updated at 175 to reflect the purchase. The account balance information, as well as information identifying the purchaser 105 and the recipient, may be stored in a retrievable and accessible fashion. For example, the information may be stored in computer database 180. After the purchaser 105 has paid (or authorized payment) for the purchase card, and it is posted to a credit card account, the acceptance process is complete and the acceptance process terminates at 160.

An account for the purchase card is created at 190. This may be performed by a third party processor that establishes and manages purchase card accounts for example, at 200. Creation of the purchase card account may comprise various actions, such as, recording the recipients 215 name, address and phone number, imprinting a card with an account number, a recipient name and an expiration date, encoding the card to record the purchase value stored thereon, and other actions, such as, for example, preparing account fulfillment documents (e.g. card carrier activation, etc.).

When the purchase card account is complete, the card is delivered. In one embodiment of the invention, card may be affiliated with a particular network, such a credit network, or debit network. For example, a card may be affiliated with the VISA® network. The delivery may be to the purchaser 105 or to the recipient 215, as shown at 210. The place of delivery may be arranged during the initial purchase of the card or other suitable time before delivery.

Information regarding an account is sent to account file 220, where an account can be monitored. In one embodiment, account file 220 allows monitoring of the current balance of an account, any activity in the account, including debits and credits, transaction updates, and the like. Other information about an account, such as purchase dispute resolutions, the history provided by the customer, and account status, may also be monitored.

Figure 2:
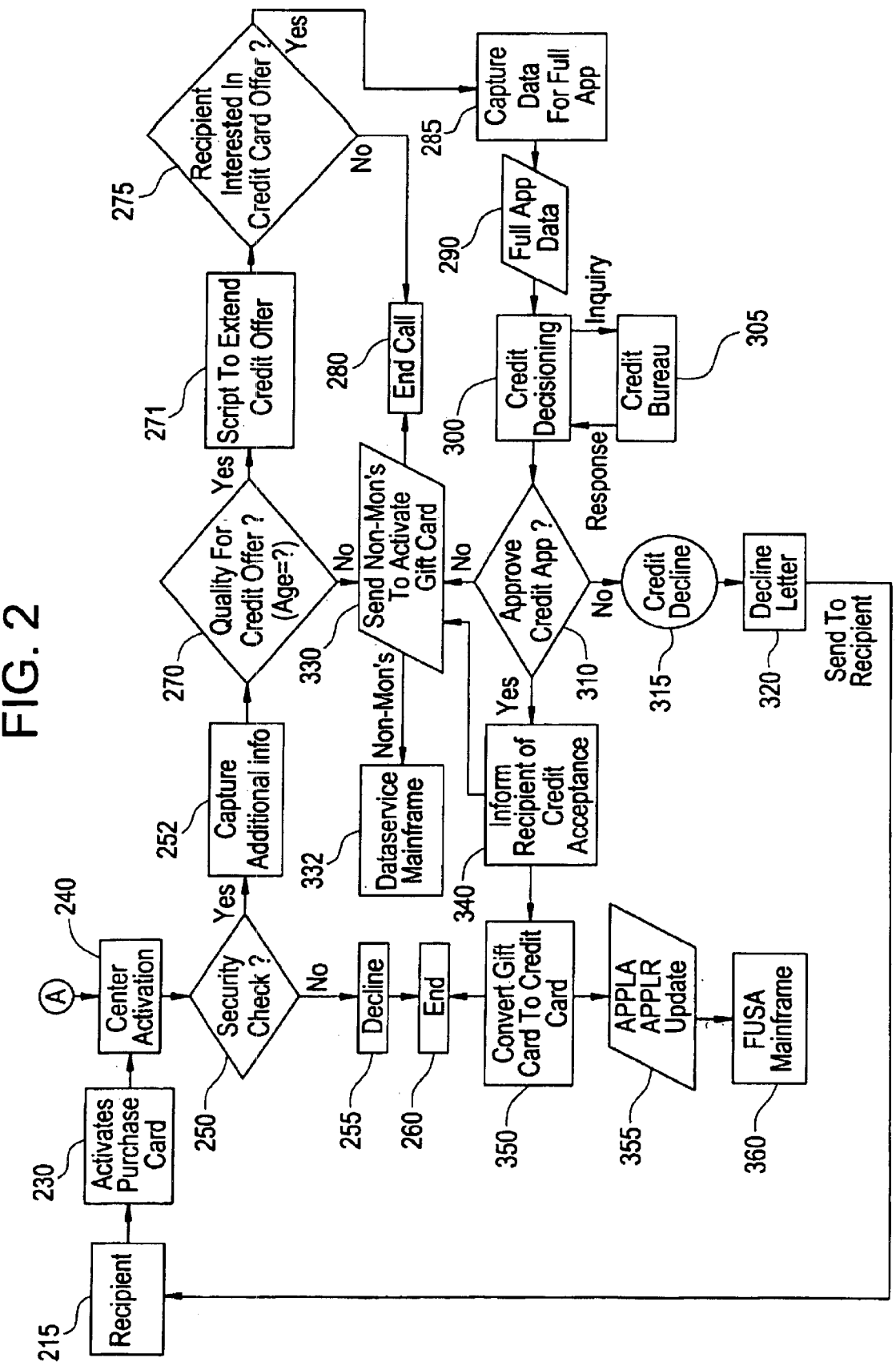
FIG. 2 shows a flow diagram for another portion of the purchase card system.

Before the purchase card can be used to make purchases, it must be activated as shown in FIG. 2 at 230. Activation may be accomplished in any suitable manner. For example, the recipient 215 of the card may place a telephone call to an activation center 240. Activation center 240 may act as a telemarketing vendor by verifying information about the recipient (i.e. name, address, telephone number, etc.) before the purchase card is activated. The activation center 240 may then transmit the data about the recipient to Data Service 200 to activate the purchase card for use. Activation center 240 may also modify information about a recipient, such as, for example, a change of address. Other forms of activation, such as by computer network may also be used.

During activation certain verifications may be made at 250 to ensure that the intended recipient 215 is the person attempting to activate the purchase card. These security checks 250 may entail questions about personal information (e.g., name, address, telephone number, etc.) or may utilize other well known methods of authenticating the recipient 215. If the person attempting to activate the purchase card does not pass the security check 250, the purchase card will be denied activation at 255 and the activation process may terminate at 260. If the person attempting to activate the purchase card passes the security check 250, they may be prompted at 252 for more information. The information may be used for subsequent security checks, should they be required, or to verify or complete the purchase card account information.

After activation the purchase card is ready for use. In some embodiments of the invention the activation process will end at this point. The recipient 215 may now use the purchase card to make purchases where ever, for example, VISA® cards are accepted. Each time a purchase is made using the card, the amount of the purchase will be debited from the card's available balance. The purchase card will continue to operate as long as a positive balance remains on the card. Some embodiments of the purchase card may have the capacity to have additional purchase value added to them after they have been activated.

If the recipient of a purchase card is someone other than the purchaser, the issuer of the card may notify the purchaser regarding various aspects of the card. For example, in one embodiment of the invention, the issuer could notify the purchaser that the purchase card has been received and activated by the intended recipient. An issuer may also notify a purchaser where the purchase card is being used, or what products are being purchased with the purchase card.

Some embodiments of the purchase card will include an expiration date. After the expiration date has passed the purchase card will be de-activated and cease to operate. In another embodiment of the present invention, a recipient or a purchaser of a purchase card may add to the balance of the purchase card account. This may take place in a manner substantially similar to the original purchasing of the purchase card. For example, a recipient of a purchase card may request that an amount be posted to the recipient's credit card and that the same amount then be credited to the recipient's purchase card account. Other methods of adding to the balance of a purchase card account may also be used.

Another embodiment of the invention allows the recipient 215 to convert the purchase card into a credit card. Conversion may be accomplished in the following manner. The recipient 215 calls the activation center 240 to activate the purchase card and the security check 250 may be performed in the usual manner. After passing the security check, the age of the recipient 215 is determined at 270. If the recipient 215 is an adult (e.g., over the age of 18) an offer to convert the purchase card into a credit card may be extended at 271. At step 275 the recipient 215 may decline the offer to convert, in which case the process may terminate at 280. If the recipient 215 elects to convert the purchase card to a credit card the activation center 240 may capture additional data 285 from recipient 215, in order to complete a credit card application. At step 290 the credit card application data is forwarded to a credit decisioning office 300. The credit decisioning office 300 may make inquiries to a credit bureau 305, for example, obtaining a credit report on the recipient 215. At 310 the decision is rendered whether to approve the credit card application. If the application for a credit card is declined at 315, the recipient 215 may be notified at 320. Notification may be in any suitable form, for example, a letter explaining the declined application may be mailed at 320 to the recipient 215. Other forms of notification may also be used to notify recipient 215 of the declined application.

Even though the credit card application is declined at 310, the purchase card is activated for use. At 330, the account settings allowing a card to be used at merchants are sent to the data service 200 and the card will be activated as a purchase card account. Information pertaining to the purchase card account is stored in a retrievable and accessible manner. For example, the purchase card account information may be stored in a computer 332.

If the decision at 310 is to accept the application for a credit card, the recipient 215 may be notified at 340. Again, notification may be in any suitable form, for example, a letter or other suitable notification. Regardless of the decision whether to convert the purchase card into a credit card, the purchase card is activated at the end of the activation call. If the purchase card is not already active, it may be activated at 345. At 350 the purchase card is converted to a credit card. The credit card will function in a manner usual for such credit instruments. For example, a credit limit may be assigned, periodic account activity statements may be generated and finance charges may be applied to any outstanding balance. In one embodiment, any remaining balance from the purchase card account may be transferred and applied to the credit card account. At 355 an update is sent to a retrievable data storage system, for example, computer 360. The update 355 sends credit card application decisions into a database.

In another embodiment of the purchase card, a financial institution (e.g., a bank) issues a credit card to a cardholder. The card may be a co-branded card issued in cooperation with a sponsor. In this embodiment, the sponsor offers a rebate to the cardholder based upon the dollar value amount of purchases made with the co-branded credit card. The rebate may apply to all purchases made or just to purchases made from the sponsor. The rebate may be calculated in a manner specified by the terms of the cardholder agreement or other disclosures to the cardholder. In one embodiment of the invention, disclosure about the rebate is provided to the cardholder in a separate form included with the cardholder agreement. For example, the sponsor may offer a flat percentage rebate for purchases made. In one embodiment of the invention, the card issuer calculates the rebate due the cardholder based on the balance paid.

In another embodiment, the sponsor notifies the financial institution of the amount of rebate to be awarded to the cardholder. The financial institution will then issue a purchase card for the amount of the rebate. The purchase card may be used for purchases in the above described manner, for example, everywhere VISA® is accepted, or the purchase card may be used for purchases solely with the sponsor or other designated entities.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A computer implemented method for issuing a stored value card affiliated with a predetermined credit network and an issuer, the method comprising:

presenting an individual human purchaser with an opportunity to buy the stored value card;

prior to issuing the stored value card, determining with a computer processor whether the individual human purchaser has sufficient funds in a card-based account of the individual human purchaser to pay for the stored value card;

creating in a computer database an independent stored value card account for a recipient designated by the individual human purchaser, wherein the independent stored value card account comprises information about:

a) the recipient's name;

b) a stored value card account number; and c) a stored value card purchase amount;

the independent stored value account being accessible by the recipient to add funds after the card is issued;

issuing the stored value card by the issuer directly to the recipient, wherein the stored value card is marked with the designated recipient's name at the time of issuance and at least one of credit network identification indicia associated with the credit network and issuer identification indicia associated with the issuer, and wherein the stored value card is accepted for purchases anywhere the predetermined credit network is accepted for purchases;

receiving notification from the recipient that the stored value card has been received, wherein said notification occurs separate from the recipient's use of the card to execute a stored value card transaction;

verifying the identity of the recipient; and activating the stored value card based on the verification.

2. The computer implemented method according to claim 1, wherein the step of receiving notification from the recipient activates the stored value card.

3. The computer implemented method according to claim 2, further comprising the step of notifying the individual human purchaser that the stored value card has been received by the recipient.

4. The computer implemented method according to claim 2, where the stored value card is active for a predetermined period of time.

5. The computer implemented method according to claim 1, where the independent stored value card account contains a monetary amount determined by the individual human purchaser.

6. The computer implemented method according to claim 1, where money can be added to an issued stored value card account by the recipient.

7. The computer implemented method according to claim 1, where the purchaser adds funds to the card account.

8. The computer implemented method according to claim 1, where the predetermined credit network and the issuer are the same.

9. The computer implemented method according to claim 1, where the predetermined credit network and the issuer are different.

10. A computer implemented system for issuing a stored value card affiliated with a predetermined credit network and an issuer, the system comprising:

means for presenting an individual human purchaser with an opportunity to buy the stored value card;

means for determining whether the individual human purchaser has sufficient funds available in a card-based account of the individual human purchaser to pay for the stored value card prior to issuing the stored value card;

means for creating an independent stored value card account for a recipient designated by the individual human purchaser, wherein the independent stored value card account comprises information about:

a) the recipient's name
   b) a stored value card account number; and
   c) a stored value card purchase amount,
   the independent stored value account being accessible by the recipient to add funds after the card is issued;

means for issuing the stored value card by the issuer directly to the recipient, wherein the stored value card is marked with the designated recipient's name at the time of issuance and at least one of credit network identification indicia associated with the credit network and issuer identification indicia associated with the issuer, and wherein the stored value card is accepted for purchase anywhere the predetermined credit network is accepted for purchases; and means for receiving notification from the recipient that the stored value card has been received wherein said notification occurs separate from the recipient's use of the card to execute a stored value card transaction and includes verifying the identity of the recipient and activating the stored value card based on the verification.

11. The computer implemented system according to claim 10, wherein the means for receiving notification from the recipient activates the stored value card.

12. The computer implemented system according to claim 11, where money can be added to an issued stored value card account by the recipient.

13. The computer implemented system according to claim 11, wherein the means for receiving notification from the recipient further comprises means for the issuer of the stored value card to notify the individual human purchaser that the stored value card has been received by the recipient.

14. The computer implemented system according to claim 11, where the stored value card is active for a predetermined period of time.

15. The computer implemented system according to claim 10, where the stored value card account contains a monetary amount determined by the individual human purchaser.

16. The computer implemented system according to claim 10, where the purchaser adds funds to the card account.

17. The computer implemented system according to claim 10, where the predetermined credit network and the issuer are the same.

18. The computer implemented system according to claim 10, where the predetermined credit network and the issuer are different.

* * * * *